Patented Apr. 1, 1924.

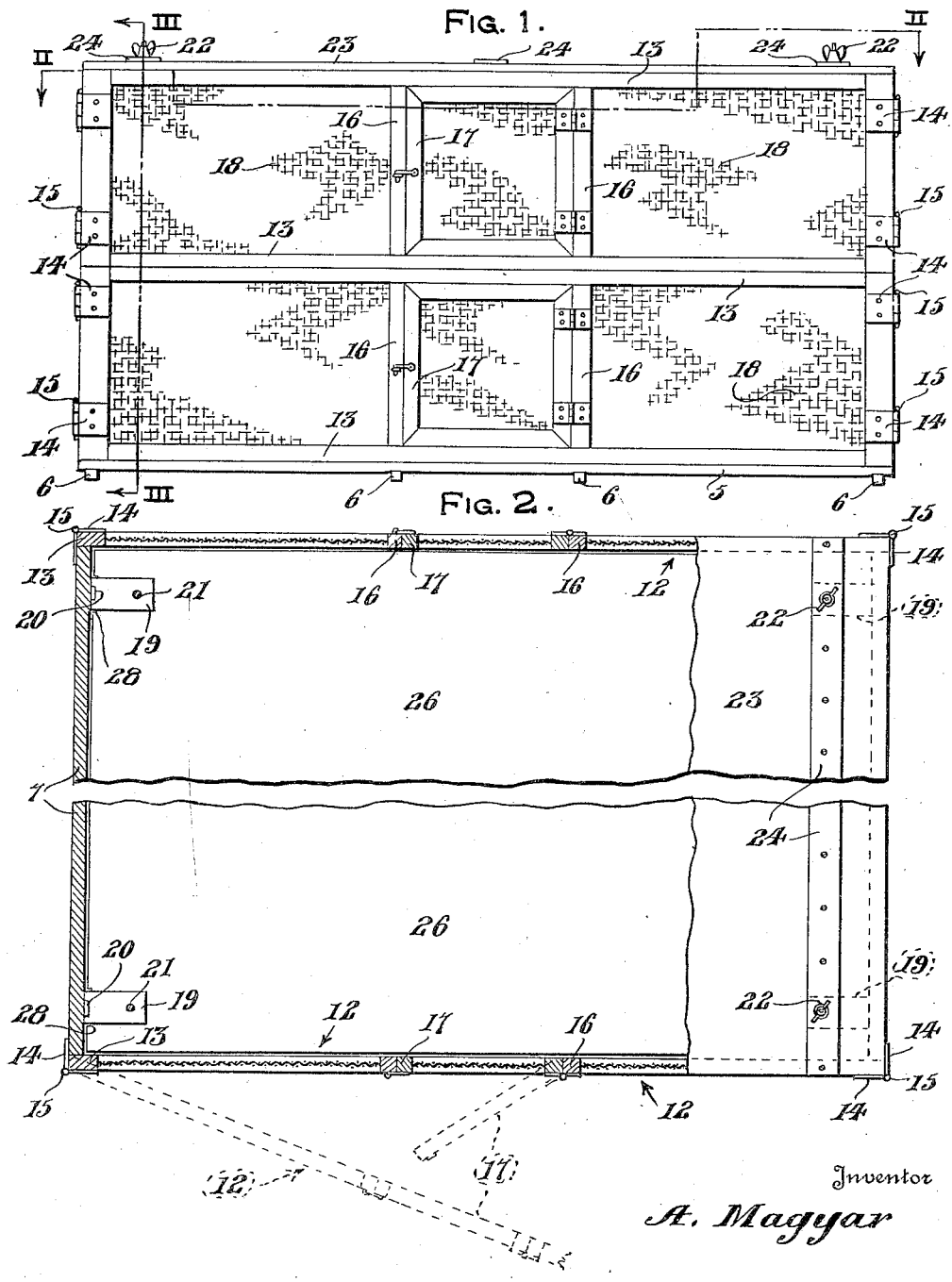

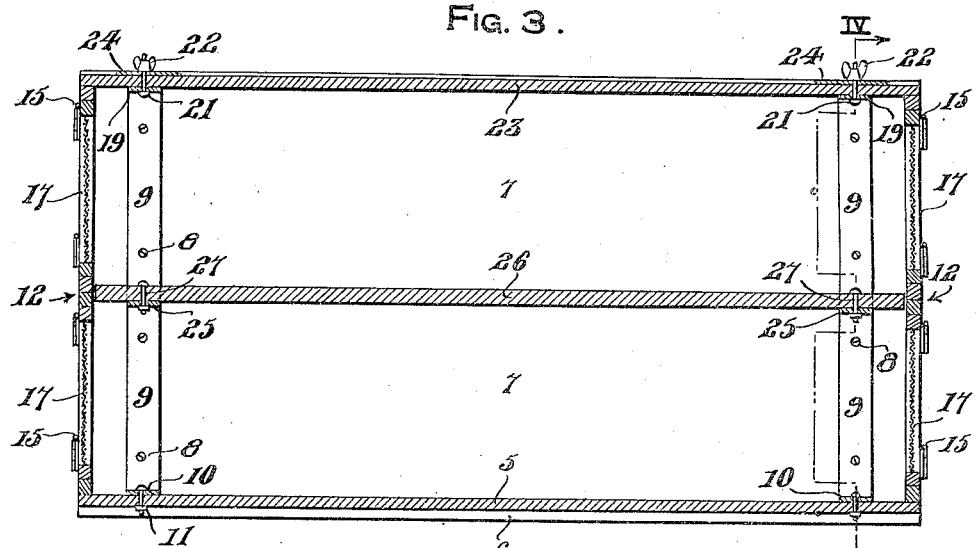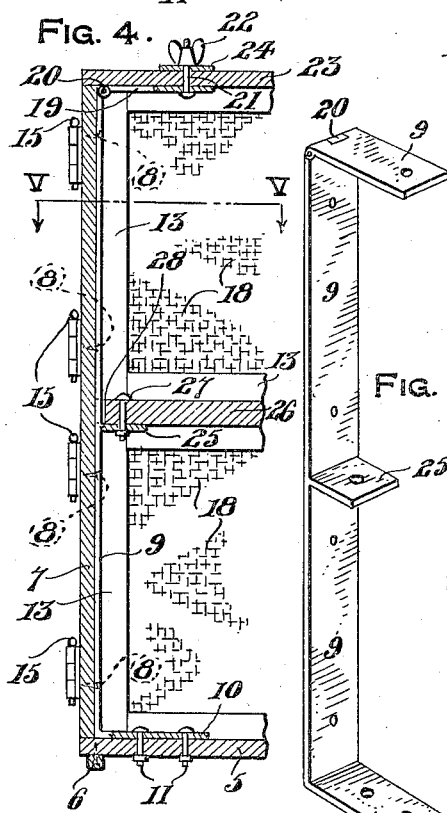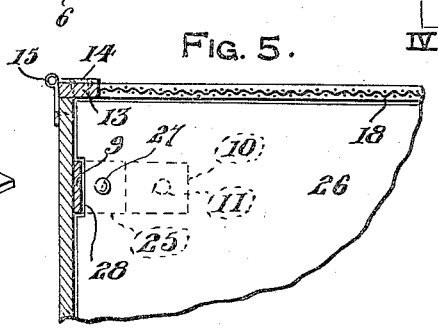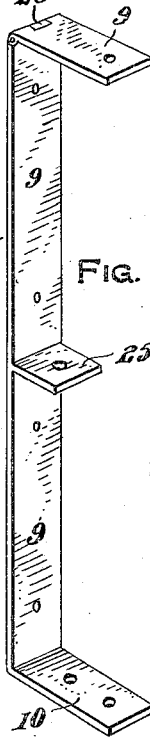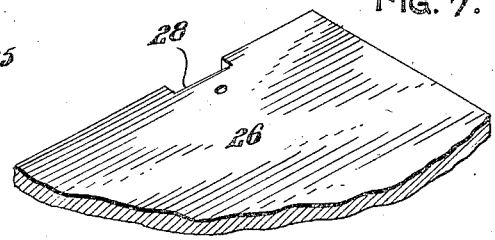

1,489,090

UNITED STATES PATENT OFFICE.

ANDREW MAGYAR, OF ST. PAUL, MINNESOTA.

POULTRY COOP.

Application filed May 4, 1923. Serial No. 636,580.

*To all whom it may concern:*

Be it known that I, ANDREW MAGYAR, a citizen of the United States of America, residing at St. Paul, in the county of Ramsey and State of Minnesota, have invented certain new and useful Improvements in Poultry Coops, of which the following is a specification.

This invention relates to new and useful improvements in poultry coops of the type best adapted for transportation purposes.

An important object of the invention is to provide a device of the above mentioned character which is capable of being quickly altered to accommodate fowl of different sizes.

A further object of the invention is to provide a poultry coop that is formed from a series of complete units which may be quickly and easily connected together to provide the assembled device.

A further object of the invention is to provide a coop of the above mentioned type which is constructed in a suitable manner to facilitate the easy cleaning of the same.

Other objects and advantages of the invention will be apparent during the course of the following description.

In the accompanying drawing forming a part of this specification and in which like numerals are employed to designate like parts throughout the same, Figure 1 is a side elevational view of the poultry coop completely assembled, Figure 2 is a horizontal sectional view, partly in top plan view, taken on line II—II of Fig. 1, Figure 3 is a vertical sectional view taken on line III—III of Fig. 1, Figure 4 is a fragmentary vertical sectional view taken on lines IV—IV of Fig. 3, Figure 5 is a fragmentary horizontal sectional view taken on line V—V of Fig. 4, Figure 6 is a detail perspective view of the bracing strip employed for properly connecting the various complete units constituting the device, and Figure 7 is a fragmentary perspective view of a horizontal partition unit embodied in this invention.

In the drawings, wherein for the purpose of illustration is shown a preferred embodiment of this invention, the numeral 5 designates an imperforate bottom wall or floor that is preferably constructed from wood having transverse brace strips 6 suitably connected thereto. Imperforate end walls 7, preferably constructed from wood, are suitably connected as by screws 8 to metallic substantially E-shaped brace strip 9, the bottom laterally extending arm 10 of the said strips being provided for connection with the bottom wall 5 by means of the bolts 11 thereby providing permanent connections between the end walls and bottom wall.

There are further provided side walls 12 each of which consists of two identical skeleton frame members 13 that are connected to the end walls 7 by means of the hinge plates 14 and removable pintles 15. Permanently secured to the skeleton frame members 13 are door frames 16 to which are hingedly connected the doors 17. It is to be understood that the skeleton frame sections 13 and doors 17 are provided with sections of wire mesh or screening 18, as clearly shown in the various views.

The substantially E-shaped brace strips 9, as best shown in Figs. 4 and 6, are each constructed with a laterally extending upper arm portion 19 that is pivotally connected, as at 20, to the main body portion of the strip and is adapted to be connected, as by the bolts 21 and wing nuts 22 through an imperforate top wall 23 which is preferably constructed of wood and provided with transverse brace strips 24.

The central laterally extending relatively short arm 25 formed on the E-shaped brace strip 9 is provided for supporting the imperforate transverse partition 26 which is removably secured thereto by means of the bolts 27, the said partition 26 being provided with cutout portions 28, as best shown in Figs. 4, 5 and 7, for the purpose of allowing the body portion of the E-shaped brace strip 9 to be positioned therein.

With the various complete units in their respective assembled positions as shown in the various views, it will be seen that there are provided upper and lower compartments of suitable height for housing poultry such as chickens, pigeons, or the like that may be placed therewithin through the doors 17 carried by the side wall frames 13. Should the user desire to convert the coop into one single compartment adapted for housing larger poultry, such as turkeys or geese, the top wall or cover 23 may be removed from the laterally extending brace arms 19 by means of the bolts 21 and wing nuts 22 after which the said arms 19 may be moved into their vertical or upright positions due to the hinge connection 20. By removing the nut bolts 27, the transverse partition 24 may be removed upwardly through the then open top of the coop. The top wall or cover 23 may then be replaced and secured in position as shown in the various views. By inspecting Fig. 2, it will be seen that the side walls, which consist of the screened skeleton sections 13, may be swung into their dotted line position by first removing the pintles 15 from the hinges at one end of the same, thereby greatly facilitating the cleaning of the bottom wall 5 and the transverse partition 26, should the same be in use. Should the user desire to disassemble the coop for the purpose of storing the same, or for shipment without poultry being housed therein, it will be seen that the various units may be disassembled due to the fact that they are all connected together by means of removable bolts and nuts or hinges with removable pintles.

It is to be understood that the form of this invention herewith shown and described is to be taken as a preferred example of the same, and that various changes in the shape, size, and arrangement of parts may be resorted to without departing from the spirit of the invention or the scope of the subjoined claims.

Having thus described the invention, I claim:

1. In a device of the type described, a bottom wall, end walls, a top wall, a transverse horizontal partition spaced from said bottom and top walls, E-shaped brace strips adapted for removably connecting said bottom, end, and top walls and said partitions in their relative assembled positions, and side walls removably connected to said end walls.

2. In a device of the type described, end walls, E-shaped brace strips carried thereby, a bottom wall removably secured to the lower arms of said strips, a transverse horizontal partition removably secured to the middle arm of said strips, a top wall removably secured to the upper arm of said strips, and side walls hingedly connected to said end walls.

3. In a device of the type described, a bottom wall, end walls, a top wall, a transverse horizontal partition spaced from said bottom and top walls, brace strips adapted for connecting said bottom, end, and top walls and said partitions in their relative assembled positions, and side walls removably connected to said end walls, said brace strips each comprising a body portion, a laterally extending arm integrally formed with said body portion and connected to said bottom wall, a laterally extending middle arm integrally formed with said body portion and connected to said partition, and an upper arm hingedly connected to said body portion and removably connected to said top wall.

In testimony whereof I affix my signature.

ANDREW MAGYAR.